(12) United States Patent
Totani

(10) Patent No.: US 9,254,630 B2
(45) Date of Patent: Feb. 9, 2016

(54) PLASTIC FILM JOINING METHOD

(71) Applicant: TOTANI CORPORATION, Kyoto (JP)

(72) Inventor: Mikio Totani, Kyoto (JP)

(73) Assignee: TOTANI CORPORATION, Kyoto (JP)

( * ) Notice: Subject to any disclaimer, the term of this patent is extended or adjusted under 35 U.S.C. 154(b) by 241 days.

(21) Appl. No.: 14/078,644

(22) Filed: Nov. 13, 2013

(65) Prior Publication Data

US 2015/0129125 A1    May 14, 2015

(51) Int. Cl.
*B32B 37/00* (2006.01)
*B29C 65/16* (2006.01)
*B29C 65/18* (2006.01)
(Continued)

(52) U.S. Cl.
CPC ......... *B32B 37/0076* (2013.01); *B29C 65/1632* (2013.01); *B29C 65/1654* (2013.01); *B29C 65/1658* (2013.01); *B29C 65/1664* (2013.01); *B29C 65/1667* (2013.01); *B29C 65/1683* (2013.01); *B29C 65/18* (2013.01); *B29C 65/7891* (2013.01); *B29C 66/004* (2013.01); *B29C 66/02* (2013.01); *B29C 66/1122* (2013.01); *B29C 66/133* (2013.01); *B29C 66/43* (2013.01); *B29C 66/4322* (2013.01); *B29C 66/4722* (2013.01); *B29C 66/83221* (2013.01); *B29C 66/83413* (2013.01); *B29C 66/8432* (2013.01); *B29C 66/84121* (2013.01); *B29C 66/8511* (2013.01); *B31B 1/00* (2013.01); *B29C 66/73921* (2013.01); *B29C 66/934* (2013.01); *B29C 2793/009* (2013.01); *B29L 2031/463* (2013.01); *B29L 2031/7128* (2013.01); *B31B 2219/6092* (2013.01); *B31B 2237/05* (2013.01);

(Continued)

(58) Field of Classification Search
CPC ............ B29C 65/1632; B29C 65/1634; B29C 65/1658; B29C 65/1664; B29C 65/1667; B29C 65/1683; B29C 65/18; B29C 65/7891; B29C 66/004; B29C 66/02; B29C 66/1122; B29C 66/133; B29C 66/43; B29C 66/4322; B29C 66/4722; B29C 66/83221; B29C 66/83413; B29C 66/84121; B29C 66/8431; B29C 66/8511; B31B 1/00; B32B 37/0076
See application file for complete search history.

(56) References Cited

U.S. PATENT DOCUMENTS 3,328,220 A    6/1967  Harding
4,085,244 A    4/1978  Stillman
5,283,017 A    2/1994  Rohleder

FOREIGN PATENT DOCUMENTS

CH    1884348 A1 *  2/2008  .......... B29C 65/5042
DE    1779206        8/1972
(Continued)

*Primary Examiner* — Daniel McNally
(74) *Attorney, Agent, or Firm* — Kirschstein, Israel, Schiffmiller & Pieroni, P.C.

(57) ABSTRACT

Plastic films are prevented from being peeled off from each other at a joining portion. A composite film has superposed external and internal films and is superposed with an additional body. The films and the body are joined with each other to form a first joining portion between the films, and a second joining portion between the internal film and the body. The first joining portion has a first joining width and includes first outer and inner edges. The second joining portion has a second joining width and includes second outer and inner edges. The first or second joining width is adjusted such that the first joining width is less than the second joining width, with the first inner edge formed outwardly of the second inner edge.

10 Claims, 11 Drawing Sheets

(51) Int. Cl.
  *B29C 65/78* (2006.01)
  *B29C 65/00* (2006.01)
  *B31B 1/00* (2006.01)
  *B29L 31/00* (2006.01)
  *B29L 31/46* (2006.01)

(52) U.S. Cl.
  CPC ..... *B32B 2310/0843* (2013.01); *B32B 2439/06* (2013.01); *Y10T 156/10* (2015.01)

(56) References Cited

FOREIGN PATENT DOCUMENTS

| | | |
|---|---|---|
| EP | 1884348 | 2/2008 |
| FR | 1475799 | 4/1967 |
| GB | 1224747 | 3/1971 |
| JP | 60157842 | 8/1985 |
| JP | 08142283 | 6/1996 |
| JP | 10250747 | 9/1998 |
| JP | 2002510566 | 4/2002 |
| JP | 3324953 | 7/2002 |
| JP | 2004148635 | 5/2004 |
| JP | 2006015405 | 1/2006 |
| JP | 2007238129 | 9/2007 |
| JP | 4104073 | 4/2008 |
| JP | 2008155976 | 7/2008 |
| JP | 2009202502 | 9/2009 |
| JP | 2009202928 | 9/2009 |
| JP | 4404288 | 11/2009 |
| JP | 2009255461 | 11/2009 |
| JP | 2011235933 | 11/2011 |
| WO | 9951421 | 10/1999 |

* cited by examiner

A

B

A

B

C

PLASTIC FILM JOINING METHOD

TECHNICAL FIELD

The invention relates to a plastic film joining method.

BACKGROUND

For example, Japanese Laid-Open Patent Publication No. 2007-238129 discloses a plastic bag used as an internal bag received in a bag in box. In the internal bag, a composite film is composed of external and internal films opposed to and superposed with each other, to have opposite end portions. The internal bag includes two of the composite films opposed to and superposed with each other. A process is then performed to join all the films with each other at the opposite end portions so that first joining portions should be formed between the external and internal films, a second joining portion being formed between the internal films, to make the plastic bag which is used as the internal bag. The external and internal films comprise plastic films.

In this case, the external and internal films are subjected to an impact load when dropping the internal bag so that a stress must be concentrated on the second joining portion formed between the internal films. The internal films may therefore be peeled and separated off from each other at the second joining portion, resulting in break of the internal bag.

The same is true of the internal bag received in the bag in box of Japanese Laid-Open Patent Publication No. 2011-235933 and Japanese Patent Publication No. 3324953.

By the way, it is usual when joining all the films with each other that a heater is pressed against the external and internal films to heat seal and join all the films with each other. In addition, it is practicable to irradiate laser-beam between and onto the external and internal films, welding and joining all the films with each other. See Japanese Laid-Open Patent Publication No. 2009-255461, Japanese Patent Publication No. 4404288. Japanese Laid-Open Patent Publication No. S60-157842 and Japanese Patent Publication No. 4104073.

A handle may be formed of the composite film composed of the external and internal films.

It is therefore an object of the invention to provide a plastic film joining method, which can keep the plastic films from being peeled off from each other at a concerned joining portion.

SUMMARY OF THE INVENTION

According to the invention, a composite film is composed of external and internal films opposed to and superposed with each other, to have opposite end portions. The composite film is opposed to and superposed with an additional body. The method include joining the external and internal films and the additional body with each other at one of the end portions so that a first joining portion should be formed between the external and internal films, a second joining portion being formed between the internal film and the additional body. The first joining portion has a first joining width and includes first outer and inner edges formed by the first joining width. The second joining portion has a second joining width and includes second outer and inner edges formed by the second joining width. The method comprises making an adjustment of the first or second joining width, the first joining width being less than the second joining width so that the first inner edge should be formed outwardly of the second inner edge.

In a preferred embodiment, making the adjustment comprises preparing first and second heaters for the first and second joining portions. Making the adjustment further comprises making the internal film superposed with the additional body, the second heater being pressed against the internal film and the additional body to heat seal and join the internal film and the additional body with each other and make the second joining portion formed. The second heater has an effective width predetermined for adjustment of the second joining width. Making the adjustment further comprises then making the external film superposed with the internal film, the first heater being pressed against the external and internal films and the additional body to heat seal and join the external and internal films with each other and make the first joining portion formed. The first heater has an effective width predetermined for adjustment of the first joining width.

In another embodiment, making the adjustment comprises preparing a heater for the first and second joining portions. Making the adjustment further comprises making a coating of anti-adhesive agent formed between the external and internal films when the external and internal films and the additional body are superposed with each other. Making the adjustment further comprises then making the heater pressed against the external and internal films and the additional body to heat seal and join the external and internal films and the additional body with each other and make the first and second joining portions formed. The coating of anti-adhesive agent is disposed at a position and in a range predetermined for adjustment of the first joining width.

In another embodiment, making the adjustment comprises preparing a first irradiator for irradiating laser-beam between and onto the external and internal films. Making the adjustment further comprises preparing a first scanning device connected to the first irradiator to move the first irradiator in opposite directions so that the external and internal films should be scanned with the first irradiator, welding and joining the external and internal films with each other. Making the adjustment further comprises preparing a second irradiator for irradiating laser-beam between and onto the internal film and the additional body. Making the adjustment further comprises a second scanning device connected to the second irradiator to move the second irradiator in the opposite directions so that the internal film and the additional body should be scanned with the second irradiator, welding and joining the internal film and the additional body with the each other. Making the adjustment further comprises preparing a control device connected to the first and second irradiators and the first and second scanning devices to control the first and second irradiators and the first and second scanning devices individually for adjustment of the first and second joining widths.

In another embodiment, making the adjustment comprises preparing an irradiator opposed to the external and internal films and the additional body superposed with each other to irradiate laser-beam onto the external and internal films and the additional body. Making the adjustment further comprises making treatments of laser absorption applied between the external and internal films and the additional body to weld and join the external and internal films and the additional body with each other by irradiating the laser-beam. The treatments of laser absorption are disposed at positions and in ranges predetermined for adjustments of the first and second joining widths.

An intermediate film may be interposed between the external and internal films. The method includes joining the external, intermediate and internal films with each other. The first joining portion comprises a plurality of joining portions. The first joining width comprises a plurality of joining widths. The first inner edge comprises a plurality of inner edges. The plurality of joining widths are predetermined to be less in stages. The plurality of inner edges are formed outwardly in stages.

The additional body may comprise a composite film composed of external and internal films opposed to and superposed with each other, to have opposite end portions. The method includes joining all the films with each other at the opposite end portions of the composite films to make a plastic bag.

The additional body may comprise the other end portion of the composite film. The composite film is bent to have the opposite end portions opposed to and superposed with each other. The method includes joining all the films with each other at the opposite end portions to make a plastic bag.

The plastic bag may be an internal bag received in a bag in box.

The method may include joining the external and internal films and the additional body with each other at the other end portion of the composite film so that a handle should be formed of the composite film.

BRIEF DESCRIPTION OF THE DRAWINGS

FIG. 11 is a side view (A) of another embodiment, an enlarged view (B) of the plastic films of (A) and a plan view (C) of the plastic films of (A).

BEST MODE TO CARRY OUT THE INVENTION

Figure 1:
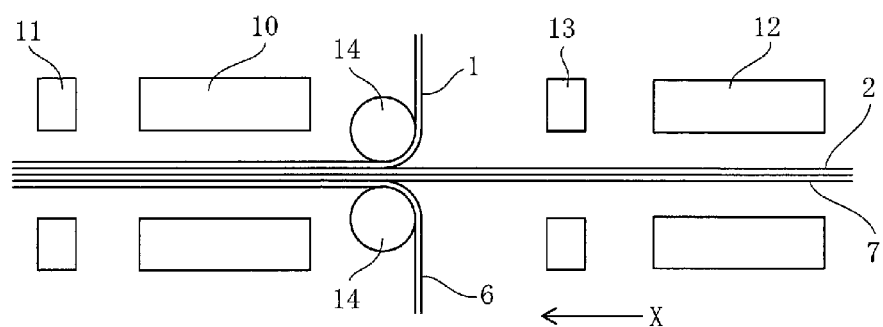
FIG. 1 is a side view (A) of a preferred embodiment of the invention and a plan view (B) of the plastic films of (A).
Figure 1:
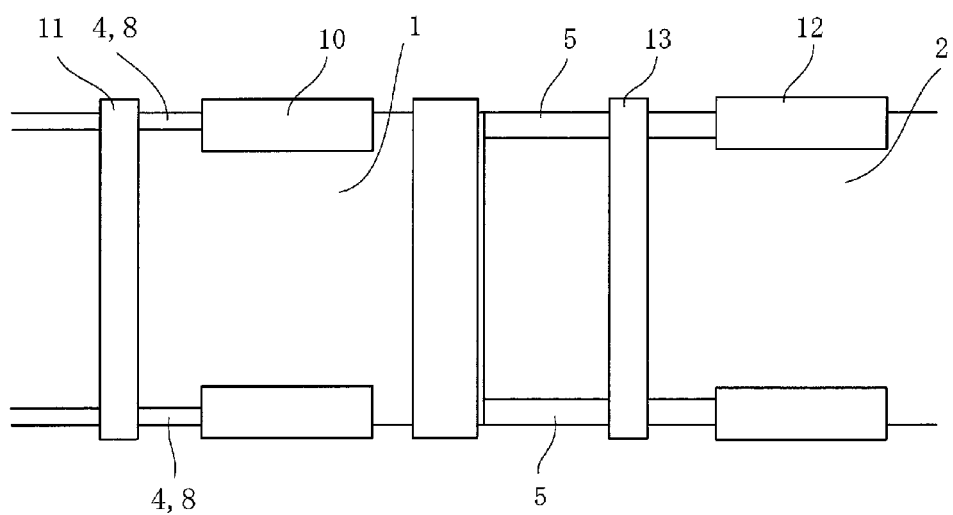
Figure 2:
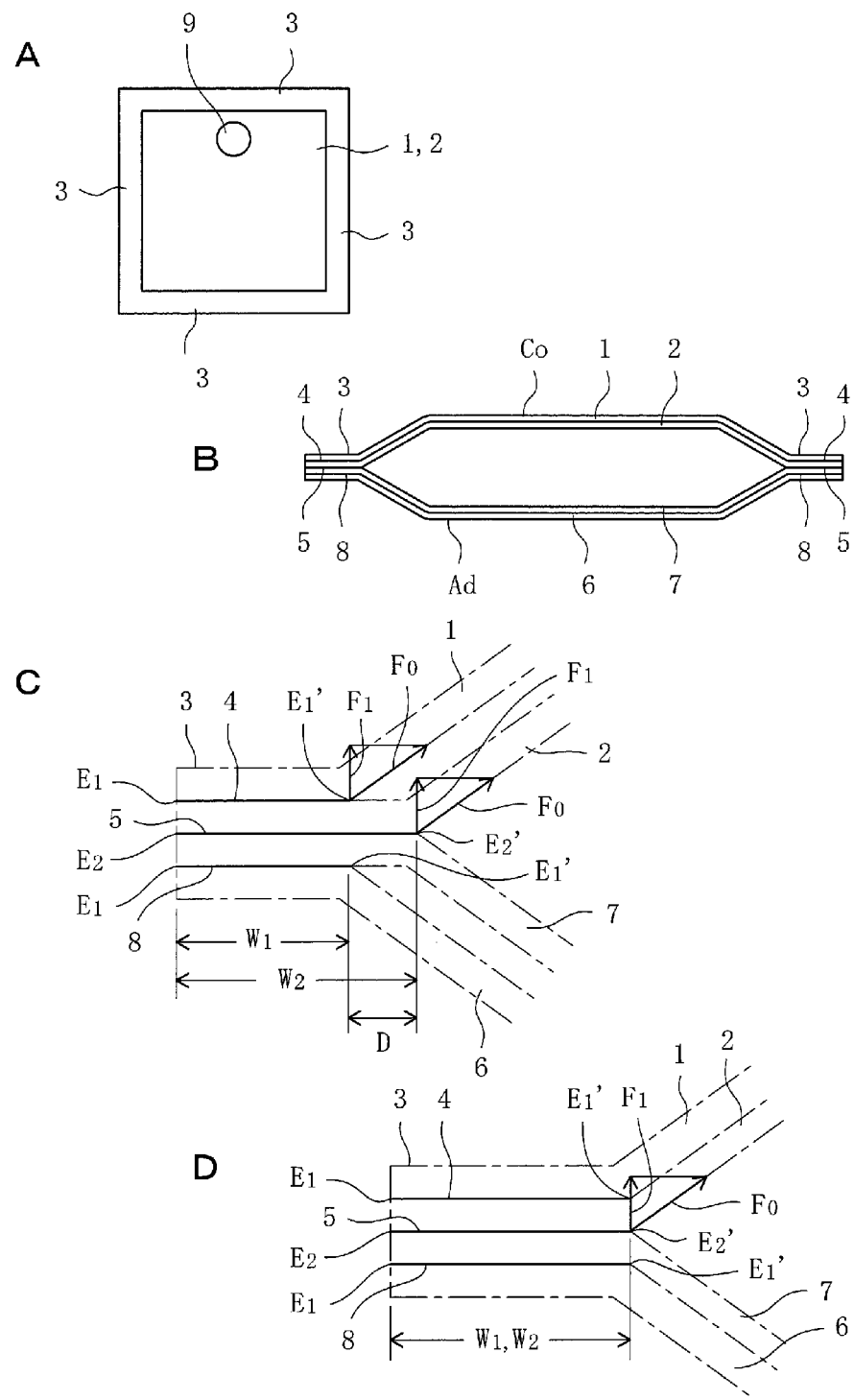
FIG. 2 is an elevational view (A) of a plastic bag obtained by the apparatus of FIG. 1, a sectional view (B) of the plastic bag of (A), an explanatory view (C) of the plastic bag of (B) and an explanatory view (D) of a plastic bag of prior art.

Turning now to the drawings, FIG. 1 illustrates an apparatus for successively making plastic bags by using a plastic film joining method according to the invention. The plastic bag is an internal bag received in a bag in box. In the method, a composite film Co is composed of external and internal films 1 and 2 opposed to and superposed with each other, to have opposite end portions 3, as shown in FIG. 2. The composite film Co is opposed to and superposed with an additional body Ad. The method includes joining the external and internal films 1 and 2 and the additional body Ad with each other at one of the opposite end portions 3 so that a first joining portion 4 should be formed between the external and internal films 1 and 2, a second joining portion 5 being formed between the internal film 2 and the additional body Ad. The first joining portion 4 has a first joining width W1 and includes first outer and inner edges E1 and E1' formed by the first joining width W1. The second joining portion 5 has a second joining width W2 and includes second outer and inner edges E2 and E2' formed by the second joining width W2.

In the embodiment, the additional body Ad comprises a composite film composed of external and internal films 6 and 7, to have opposite end portions 3. It should therefore be understood that the internal bag includes two of the composite films Co and Ad opposed to and superposed with each other. The method includes joining all the films 1, 2, 6 and 7 with each other at the opposite end portions 3 of the composite films Co and Ad so that a first joining portion 8 should be formed between the external and internal films 6 and 7, the second joining portion 5 being formed between the internal films 2 and 7. The external and internal films 1, 2, 6 and 7 comprise plastic films.

The external and internal films 1, 2, 6 and 7 are rectangular in shape to have the opposite end portions 3 in directions of length and width of the plastic bag. The method includes joining all the films 1, 2, 6 and 7 with each other at the opposite end portions 3 in the directions of length and width of the plastic bag. The first joining portions 4 is therefore formed between the external and internal films 1 and 2 at the opposite end portions 3 in the directions of length and width of the plastic bag. The first joining portion 8 is also formed between the external and internal films 6 and 7 at the opposite end portions in the directions, the second joining portion 5 being formed between the internal films 2 and 7 at the opposite end portions 3 in the directions. In addition, for example, the external and internal films 1 and 2 are provided with a spout 9, making the plastic bag of the plastic films 1, 2, 6 and 7 and the spout 9.

In order to make the plastic bag of FIG. 2, in the apparatus of FIG. 1, the external and internal films 1, 2, 6 and 7 are opposed to and superposed with each other and fed longitudinally thereof. The apparatus includes a feeding device comprising feeding rollers. The external and internal films 1, 2, 6 and 7 are directed to and sandwiched between the feeding rollers which are rotated by a drive motor so that the external and internal films 1, 2, 6 and 7 should be fed longitudinally thereof or in a direction X.

In the apparatus, the method is essential to improve the plastic bag, not resulting in break of the plastic bag. The method comprises making an adjustment of the first or second joining width W1 or W2, the first joining width W1 being less than the second joining width W2 so that the first inner edge E1' should be formed outwardly of the second inner edges E2' (FIG. 2 C).

In the embodiment, making the adjustment comprises preparing first and second heaters 10, 11, 12 and 13 for the first and second joining portions 4, 5 and 8. The external and internal films 1, 2, 6 and 7 are fed intermittently for a length and temporarily stopped whenever being fed intermittently. The first heater 10 and 11 is pressed against the external and internal films 1, 2, 6 and 7 while the second heater 12 and 13 is pressed against the internal films 2 and 7 when the external and internal films 1, 2, 6 and 7 are temporarily stopped whenever being fed intermittently, to heat seal and join all the films 1, 2, 6 and 7 with each other.

In addition, firstly, the internal film 2 is superposed with the additional body Ad, the second heater 12 and 13 being pressed against the internal film 2 and the additional body Ad to heat seal and join the internal film 2 and the additional body Ad with each other and make the second joining portion 5 formed. In the embodiment, the additional body Ad comprises the composite film composed of the external and internal films 6 and 7. The internal film 2 is therefore superposed with the internal film 7, the second heater 12 and 13 being pressed against the internal films 2 and 7 to heat seal and join the internal films 2 and 7 with each other and make the second joining portion 5 formed. The second heater 12 and 13 includes an effective width predetermined for adjustment of the second joining width W2. For example, the internal films 2 and 7 go forward and horizontally to be directed to the second heater 12 and 13. The second heater 12 and 13 comprises longitudinal and cross heaters. The longitudinal heater 12 is pressed against the inner films 2 and 7 to heat seal and join the internal films 2 and 7 longitudinally thereof so that the second joining portion 5 should be formed longitudinally of the inner films 2 and 7. The cross heater 13 is pressed against the inner films 2 and 7 to heat seal and join the internal films 2 and 7 widthwise thereof so that the second joining portion 5 should be formed widthwise of the inner films 2 and 7. The longitudinal and cross heaters 12 and 13 have the effective width predetermined for adjustment of the second joining width W2.

Subsequently, the external film 1 is superposed with the internal film 2, the first heater 10 and 11 being pressed against the external and internal films 1 and 2 and the additional body Ad to heat seal and join the external and internal films 1 and 2 with each other and make the first joining portion 4 formed. In the embodiment, the external film 1 is superposed with the internal film 2 while the external film 6 is superposed with the internal film 7, the first heater 10 and 11 being pressed against the external and internal films 1, 2, 6 and 7 to heat seal and join the external and internal films 1, 2, 6 and 7 with each other and make the first joining portions 4 and 8 formed. The first heater 10 and 11 has an effective width predetermined for adjustment of the first joining width W1. For example, the internal films 2 and 7 are directed to guide rollers 14 after heat sealing and joining them. The external films 1 and 6 go forward and upward and downward to be directed to and guided by the guide rollers 14 so that the external films 1 and 6 should be superposed with the internal films 2 and 7. The external and internal films 1, 2, 6 and 7 are then sandwiched between the guide rollers 14 and directed to the first heater 10 and 11. The guide rollers 14 may be used as the feeding rollers by which the external and internal films 1, 2, 6 and 7 are fed intermittently. In addition, the first heater 10 and 11 comprise longitudinal and cross heaters. The longitudinal heater 10 is pressed against the external and internal films 1, 2, 6 and 7 to heat seal and join the external and internal films 1, 2, 6 and 7 longitudinally thereof so that the first joining portions 4 and 8 should be formed longitudinally of the external and internal films 1, 2, 6 and 7. The cross heater 11 is pressed against the external and internal films 1, 2, 6 and 7 to heat seal and join the external and internal films 1, 2, 6 and 7 widthwise thereof so that the first joining portions 4 and 8 should be formed widthwise of the external and internal films 1, 2, 6 and 7. The longitudinal and cross heaters 10 and 11 have the effective width predetermined for adjustment of the first joining width W1.

The first and second joining portions 4, 5 and 8 are therefore formed longitudinally and widthwise of the external and internal films 1, 2, 6 and 7. In this connection, it should be understood that the first and second joining portions 4, 5 and 8 are formed along the opposite side edges of the external and internal films 1, 2, 6 and 7 when being formed longitudinally of the external and internal films 1, 2, 6 and 7. The opposite side edges therefore constitute the opposite end portions 3 in the direction of length of the plastic bag of FIG. 2. The external and internal films 1, 2, 6 and 7 are then cross cut widthwise thereof by a cross cutter when they are temporarily stopped whenever being fed intermittently, to successively make the plastic bags of the external and internal films 1, 2, 6 and 7. In this connection, it should be understood that the external and internal films 1, 2, 6 and 7 are cross cut at a position of center of the first and second joining portions 4, 5 and 8 formed widthwise of the external and internal films 1, 2, 6 and 7, to constitute the opposite end portions in the direction of width of the plastic bag of FIG. 2.

In addition, the external and internal films 1 and 2 are provided with the spout 9 when making the plastic bag, as in the case of the plastic bag of Japanese Laid-Open Patent Publication No. 2007-238129, Japanese Laid-Open Patent Publication No. 2011-235933 and Japanese Patent Publication No. 3324953.

Accordingly, in each of the opposite end portions 3 in the directions of length and width of the plastic bag of FIG. 2, the first joining width W1 can be less than the second joining width W2 by the adjustment of them, so that the first inner edges E1' should be formed outwardly of the second inner edge E2'. For example, the first inner edges E1' are formed outwardly of the second inner edge E2' at a distance D more than half of the thickness of internal film 2 or 7. The first and second outer edges E1 and E2 are coincident with each other.

The plastic bag has therefore no problem when being used as the internal bag received in the bag in box. The external and internal films 1, 2, 6 and 7 are subjected to an impact load when dropping the internal bag, as described previously so that the second joining portion 5 must be subjected to a stress F0 and a component F1, between the internal films 2 and 7. However, the first joining portions 4 and 8 are also subjected to the stress F0 and the component F1, between the external and internal films 1, 2, 6 and 7 by reason that the first inner edges E1' are formed outwardly of the second inner edges E2'. The stress F0 and the component F1 are therefore not concentrated on the second joining portion 5 but divided by the first and second joining portions 4, 5 and 8. As a result, the internal films 2 and 7 cannot be peeled and separated off from each other at the second joining portion 5, not resulting in break of the internal bag.

In addition, the plastic bag is filled with and inflated by content so that the external films 1 and 6 should be bent at the first inner edges E1', the internal films 2 and 7 being bent at the second inner edge E2'. However, the distance D is predetermined as more than half of the thickness of internal film 2 or 7, between the first and second inner edges E1' and E2', as described previously. The stress F0 and the component F1 can therefore be divided by the first and second joining portions 4, 5 and 8 regardless of the internal films 2 and 7 being bent at the second inner edge E2', involving no problem.

In the interior bag of prior art, the first and second joining widths W1 and W2 are identical with each other so that not only the first and second outer edges E1 and E2 but also the first and second inner edges E1' and E2' should be coincident with each other (FIG. 2 D). The external and internal films 1, 2, 6 and 7 are therefore subjected to an impact load when dropping the internal bag so that a stress F0 and a component F1 must be concentrated on the second joining portion 5 formed between the internal films 2 and 7. In comparison with the case of being divided by the first and second joining portions 4, 5 and 8, the stress F0 and the component F1 are doubled in strength when being concentrated on the second joining portion 5. The internal films 2 and 7 may therefore be peeled and separated off from each other at the second joining portion 5, resulting in break of the internal bag, as described previously.

In the embodiment, in view of the fact that each of the internal films 2 and 7 often has a thickness of about 0.075 mm, the distance D is predetermined as more than 0.04 mm. The distance D is therefore more than half of the thickness of internal film 2 or 7. In addition, when the distance D is more than 0.04 mm, the internal film 2 or 7 is available if being thicker. The stress F0 and the component F1 can be divided by the first and second joining portions 4, 5 and 8 regardless of the thickness of internal film 2 or 7. They cannot be concentrated on the second joining portion 5.

The distance D should be predetermined not to be more than 5 mm. In the embodiment, the distance D is therefore predetermined to 0.04-5 mm.

Figure 3:
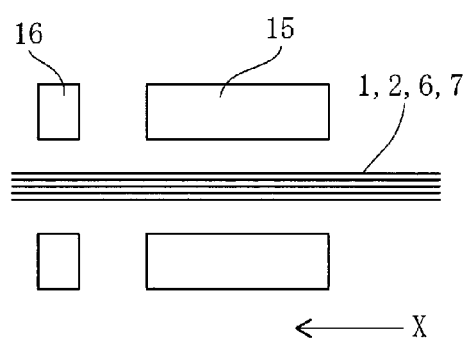
FIG. 3 is a side view (A) of another embodiment and an enlarged view (B) of the plastic films of (A).
Figure 3:
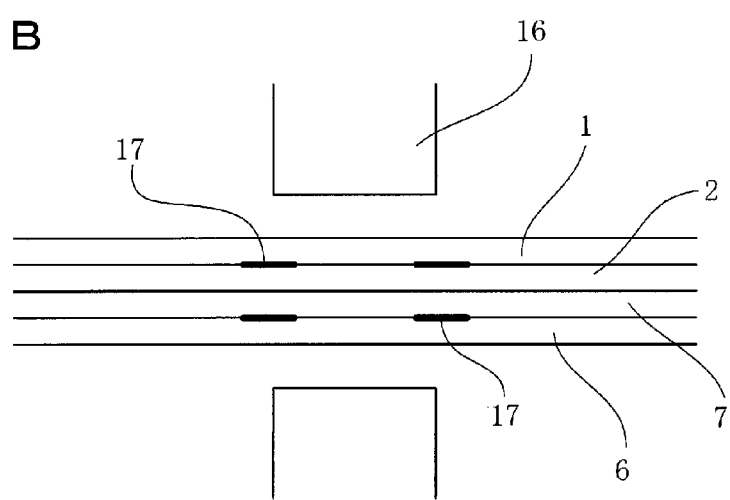

In another embodiment of FIG. 3, making the adjustment comprises preparing a heater 15 and 16 for the first and second joining portions 4, 5 and 8. The heater 15 and 16 is pressed against the external and internal films 1, 2, 6 and 7 when the external and internal films 1, 2, 6 and 7 are stopped temporarily whenever being fed, as in the case of the heaters 10, 11, 12 and 13 of FIG. 1.

In addition, a coating of anti-adhesive agent 17 is formed between the external and internal films 1 and 2 when the external and internal films 1 and 2 and the additional body Ad are superposed with each other. In the embodiment, the coating of anti-adhesive agent 17 is formed between the external and internal films 1 and 2 while the coating of anti-adhesive agent 17 is formed between the external and internal films 6 and 7 when the external and internal films 1, 2, 6 and 7 are superposed with each other. The coating of anti-adhesive agent 17 may comprise a coating of heat-resisting ink.

Subsequently, the heater 15 and 16 is pressed against the external and internal films 1 and 2 and the additional body Ad to heat seal and join the external and internal films 1 and 2 and the additional body Ad with each other and make the first and second joining portions 4 and 5 formed. In the embodiment, the heater 15 and 16 is pressed against the external and internal films 1, 2, 6 and 7 to heat seal and join all the films 1, 2, 6 and 7 with each other and make the first and second joining portions 4, 5 and 8 formed. The heater 15 and 16 comprises longitudinal and cross heaters. The longitudinal heater 15 is pressed against the external and internal films 1, 2, 6 and 7 to heat seal and join all the films 1, 2, 6 and 7 longitudinally thereof so that the first and second joining portions 4, 5 and 8 should be formed longitudinally of the external and internal films 1, 2, 6 and 7. The cross heater 16 is pressed against the external and internal films 1, 2, 6 and 7 to heat seal and join all the films 1, 2, 6 and 7 widthwise thereof so that the first and second joining portions 4, 5 and 8 should be formed widthwise of the external and internal films 1, 2, 6 and 7. Each of the coatings of anti-adhesive agent 17 is disposed at a position and in a range predetermined for adjustment of the first joining width W1. In this connection, it should be understood that the longitudinal and cross heaters 15 and 16 cannot heat seal and join the external and internal films 1, 2, 6 and 7 with each other at the positions and the ranges of coating of anti-adhesive agent 17, when being pressed.

The external and internal films 1, 2, 6 and 7 are then cross cut widthwise thereof by a cross cutter, to successively make the plastic bags, as in the case of the embodiment of FIG. 1.

The first joining width W1 can therefore be less than the second joining width W2 by the adjustment, so that the first inner edge E1' should be formed outwardly of the second inner edge E2'. The stress F0 and the component F1 are not concentrated on the second joining portion 5 but divided by the first and second joining portions 4, 5 and 8. As a result, the internal films 2 and 7 cannot be peeled and separated off from each other at the second joining portion 5, not resulting in break of the internal bag.

Figure 4:
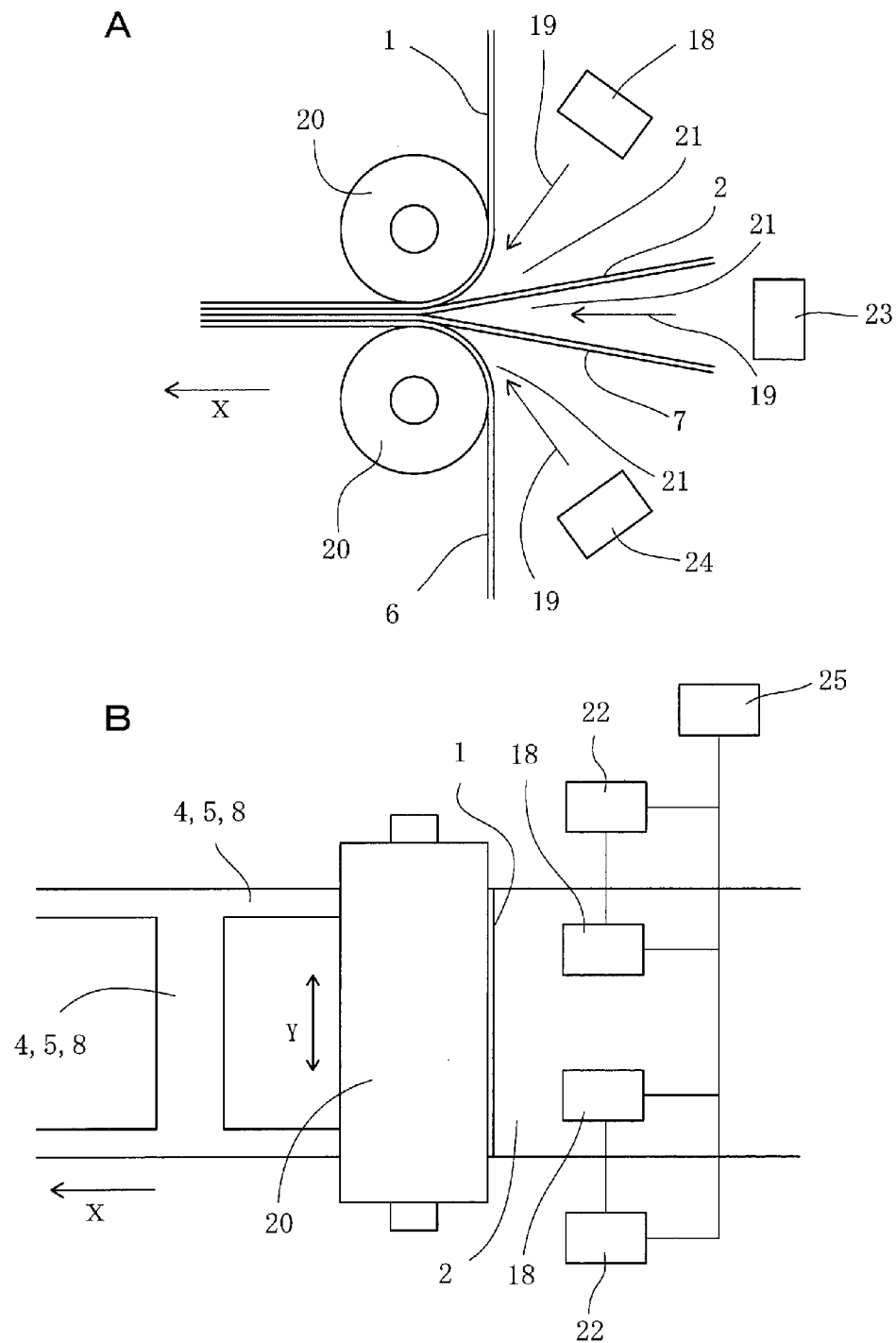
FIG. 4 is a side view (A) of another embodiment and a plan view (B) of the plastic films of (A).

In another embodiment of FIG. 4, making the adjustment comprises preparing a first irradiator 18 for irradiating laser-beam 19 between and onto the external and internal films 1 and 2. For example, pressure rollers 20 are opposed to each other, the external and internal films 1, 2, 6 and 7 being fed longitudinally thereof and directed to and curved along the pressure rollers 20 to have curved portions before being directed to the feeding rollers. Wedged clearances 21 are therefore formed between the curved portions of external and internal films 1 and 2, between the curved portions of internal films 2 and 7 and between the curved portions of external and internal films 6 and 7. The first irradiator 18 is disposed in the wedged clearance 21 of external and internal films 1 and 2 to irradiate laser-beam 19 between and onto the external and internal films 1 and 2.

In addition, a first scanning device 22 is connected to the first irradiator 18 to move the first irradiator 18 in opposite directions Y so that the external and internal films 1 and 2 should be scanned with the first irradiator 18, welding and joining the external and internal films 1 and 2 with each other. In the embodiment, the external and internal films 1 and 2 are scanned with the first irradiator 18, heating and melting the external and internal films 1 and 2 with the laser-beam. The external and internal films 1 and 2 are then superposed with each other and sandwiched between and pressurized by the pressure rollers 20, welding and joining the external and internal films 1 and 2 with each other.

Making the adjustment further comprises preparing a second irradiator 23 for irradiating laser-beam 19 between and onto the internal film 2 and the additional body Ad. In the embodiment, the second irradiator 23 is disposed in the wedged clearance 21 of internal films 2 and 7 to irradiate laser-beam 19 between and onto the internal films 2 and 7. Furthermore, an additional irradiator 24 is disposed in the wedged clearance 21 of external and internal films 6 and 7 to irradiate laser-beam 19 between and onto the external and internal films 6 and 7.

In addition, a second scanning device is connected to the second irradiator 23 to move the second irradiator 23 in the opposite directions Y so that the internal film 2 and the additional body Ad should be scanned with the second irradiator 23, welding and joining the internal film 2 and the additional body Ad with each other. In the embodiment, the internal films 2 and 7 are scanned with the second irradiator 23, heating and melting the internal films 2 and 7 with the laser-beam. An additional scanning device is connected to the additional irradiator 24 to move the additional irradiator 24 in the opposite directions Y so that the external and internal films 6 and 7 should be scanned with the additional irradiator 24, heating and melting the external and internal films 6 and 7 with the laser-beam 19. The internal films 2 and 7 and the external film 7 are then superposed with each other and sandwiched between and pressurized by the pressure rollers 20, welding and joining the internal film 2 and the external and internal films 6 and 7 with each other.

In the embodiment, the external and internal films 1, 2, 6 and 7 are fed longitudinally thereof, when irradiating the laser beam 19. In addition, it is intended to move the first, second and additional irradiators 18, 23 and 24 widthwise of the external and internal films 1, 2, 6 and 7 or in the opposite directions Y. The first and second joining portions 4, 5 and 8 can therefore be formed longitudinally and widthwise of the external and internal films 1, 2, 6 and 7. Each of the first, second and additional irradiators 18, 23 and 24 may comprise two irradiators spaced from each other widthwise of the external and internal films 1, 2, 6 and 7. In this case, the first and second joining portions 4, 5 and 8 can be formed longitudinally and along the opposite side edges of the external and internal films 1, 2, 6 and 7 without difficulty. Each of the first, second and additional scanning devices 22 may comprise a galvanometer mirror to make the external and internal films 1, 2, 6 and 7 scanned exactly.

In addition, in the embodiment, a control device 25 is connected to the first, second and additional irradiators 18, 23 and 24 and the first, second and additional scanning devices 22 to control the first, second and additional irradiators 18, 23 and 24 and the first, second and additional scanning devices 22 individually for adjustment of the first and second joining widths W1 and W2.

The control device 25 may be connected to the drive motor by which the feeding rollers are rotated and the external and internal films 1, 2, 6 and 7 are fed, controlling the drive motor to change the feeding speed. The control device 25 may be arranged to control all the scanning devices 22 to change the scanning speed. The control device 25 may be arranged to control the drive motor and all the scanning devices 22 to move all the irradiators 18, 23 and 24 in the opposite directions reciprocatingly at a pitch of 0.05-1 mm predetermined in the feeding direction X. The control device 25 may be arranged to change the stroke and position of the irradiators 18, 23 and 24 when moving them reciprocatingly. The first and second joining portions 4, 5 and 8 can therefore be formed to have any direction, width and shape predetermined. The control device 25 may be arranged to control all the irradiators 18, 23 and 24 to change the amount of light for adjustment of the joining strength.

The external and internal films 1, 2, 6 and 7 are then cross cut widthwise thereof, to successively make the plastic bags.

The first joining width W1 can therefore be less than the second joining width W2 by the adjustment, so that the first inner edge E1' should be formed outwardly of the second inner edge E2'.

Figure 5:
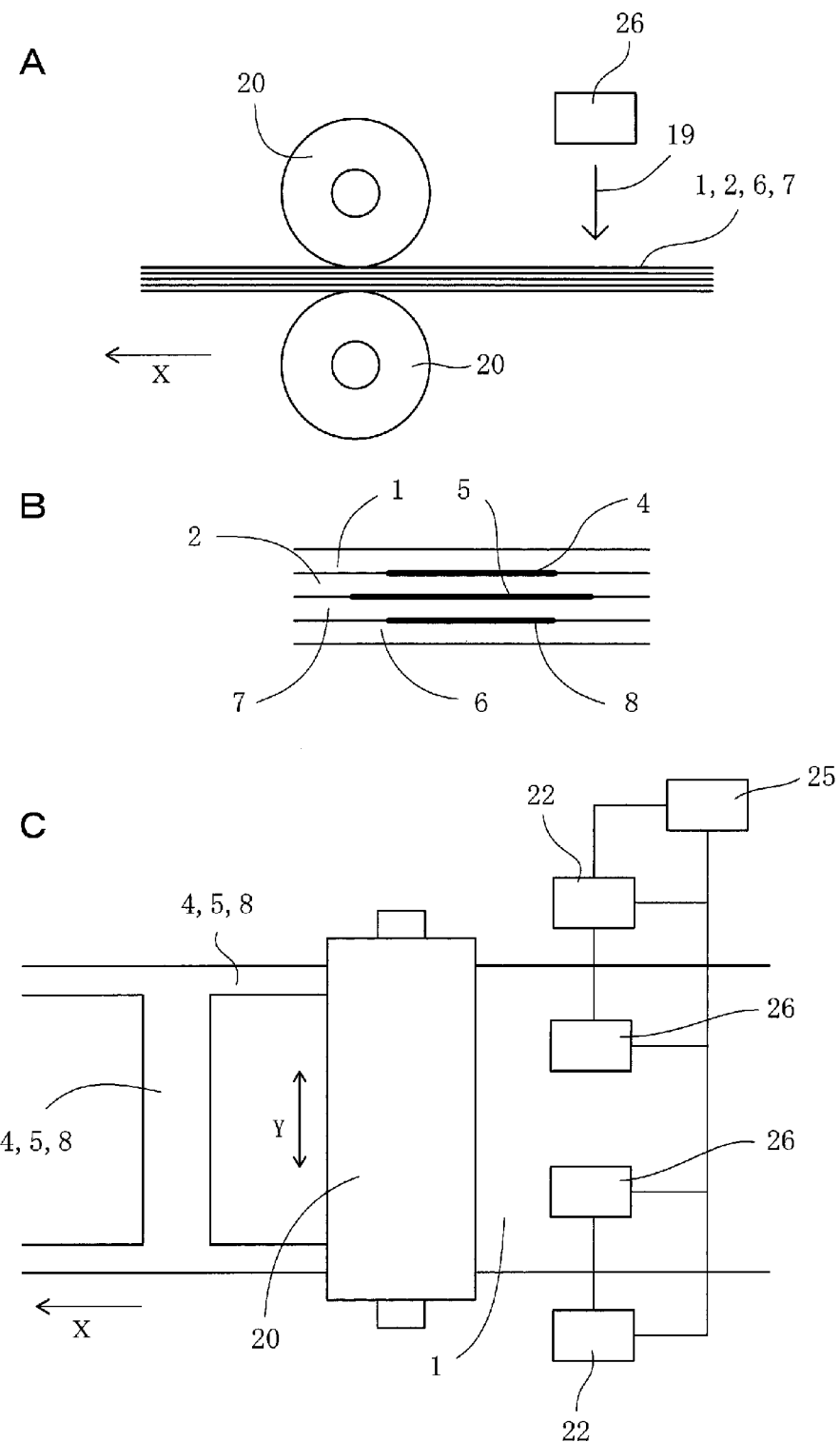
FIG. 5 is a side view (A) of another embodiment, an enlarged view (B) of the plastic films of (A) and a plan view (C) of the plastic films of (A).

In another embodiment of FIG. 5, an irradiator 26 is opposed to the external and internal films 1 and 2 and the additional body Ad superposed with each other to irradiate laser-beam 19 onto the external and internal films 1 and 2 and the additional body Ad. In the embodiment, the irradiator 26 is disposed on the upper side of the external and internal films 1, 2, 6 and 7 superposed with each other to be opposed to the external and internal films 1, 2, 6 and 7, irradiating the laser-beam 19 onto them. The irradiator 26 may be disposed on the lower side of the external and internal films 1, 2, 6 and 7. The external and internal films 1, 2, 6 and 7 are then directed to, sandwiched between and pressurized by the pressure rollers 20.

In addition, treatments of laser absorption are applied between the external and internal films 1 and 2 and the additional body Ad to weld and join the external and internal films 1 and 2 and the additional body Ad with each other by irradiating the laser-beam, as in the case of those of Japanese Patent Publication No. 4104073. In the embodiment, the treatments of laser absorption are applied between all the films 1, 2, 6 and 7 and in the joining portions 4, 5 and 8, to weld and join all the films 1, 2, 6 and 7 with each other. For example, the treatments of laser absorption may comprise treatments of surface asperity. It may comprise coatings of laser absorption agent or coatings of ink formed between all the films 1, 2, 6 and 7.

In addition, the external and internal films 1, 2, 6 and 7 are fed longitudinally thereof. A scanning device 22 is connected to the irradiator 26 to move the irradiator 26 widthwise of the external and internal films 1, 2, 6 and 7 or in the opposite directions Y so that the external and internal films 1, 2, 6 and 7 should be scanned with the irradiator 26, heating and melting the external and internal films 1, 2, 6 and 7 with the laser-beam 19. A control device 25 is connected to the irradiator 26 and the scanning device 22 to control the irradiator 26 and the scanning device 22.

The joining portions 4, 5 and 8 can therefore be formed longitudinally and widthwise of the external and internal films 1, 2, 6 and 7 by the treatments of laser absorption applied longitudinally and widthwise of the external and internal films 1, 2, 6 and 7. In addition, the treatments of laser absorption are disposed at positions and in ranges predetermined for adjustment of the first and second widths W1 and W2.

The external and internal films 1, 2, 6 and 7 are then cross cut widthwise thereof, to successively make the plastic bags.

The first joining width W1 can therefore be less than the second joining width W2 by the adjustment, so that the first inner edge E1' should be formed outwardly of the second inner edge E2'.

Figure 6:
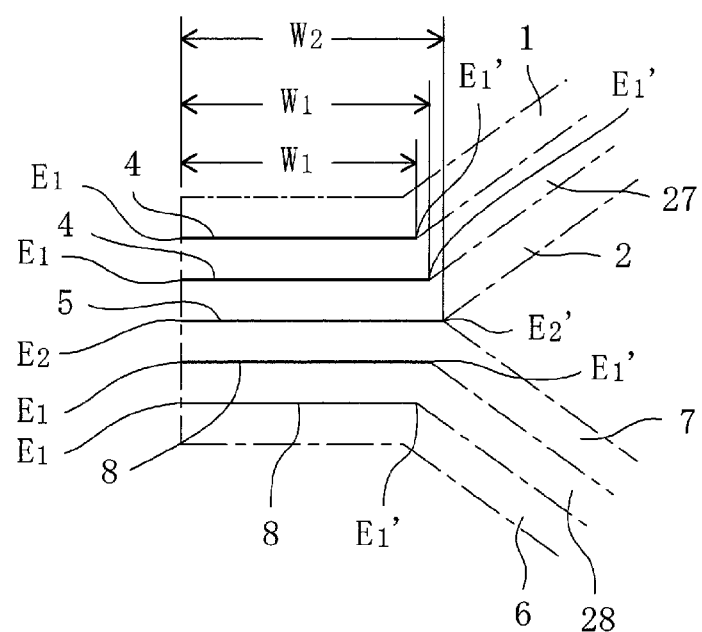
FIG. 6 is an explanatory view (A) of another embodiment and a sectional view (B) of another embodiment.
Figure 6:
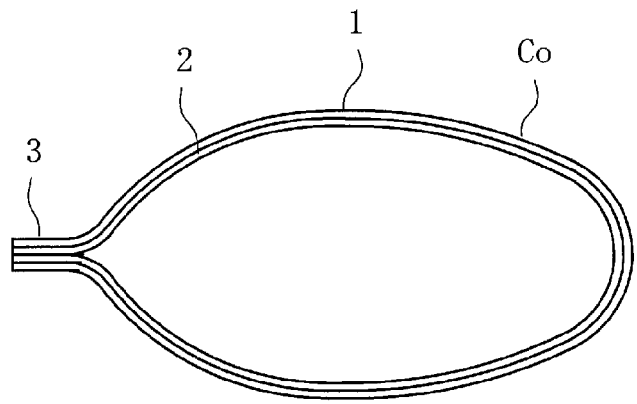

In the embodiments of FIGS. 1 to 5, an intermediate film 27 may be interposed between the external and internal films 1 and 2, an intermediate film 28 being interposed between the external and internal films 6 and 7, as shown in FIG. 6 (FIG. 6 A). The method includes joining the external, intermediate and internal films 1, 2, 6, 7, 27 and 28 with each other. Accordingly, the first joining portion 4 comprises a plurality of joining portions. The first joining portion 8 comprises a plurality of joining portions. The first joining width W1 comprises a plurality of joining widths. The first inner edge E1' comprises a plurality of inner edges. The plurality of joining widths W1 are predetermined to be less in stages. The plurality of inner edges E1' are formed outwardly in stages. The plurality of inner edges E1' may be formed outwardly in stages at a distance more than half of the thickness of internal film 2 or 7 or the intermediate film 27 or 28. The distance may be predetermined more than 0.04 mm.

In this case, all the joining portions 4, 5 and 8 are subjected to the stress F0 and the component F1. The stress F0 and the component F1 are therefore not concentrated on the second joining portion 5 but divided by all the joining portions 4, 5 and 8. As a result, the internal films 2 and 7 cannot be peeled off from each other at the second joining portion 5, not resulting in break of the internal bag.

The intermediate film 27 may comprise a plurality of films, the intermediate film 28 comprising a plurality of films. The method includes joining all the films with each other, all the joining widths being predetermined to be less in stages, all the inner edges being formed outwardly in stages.

The additional body may comprise the other end portion 3 of the composite film Co (FIG. 6 B). The composite film Co is bent to have the opposite end portions 3 opposed to and superposed with each other. The method includes joining all the films 1 and 2 with each other at the opposite end portions 3 to make a plastic bag of the external and internal films 1 and 2.

The method may include adhering and joining all the films with each other with adhesive agent applied onto the external and internal films.

Figure 7:
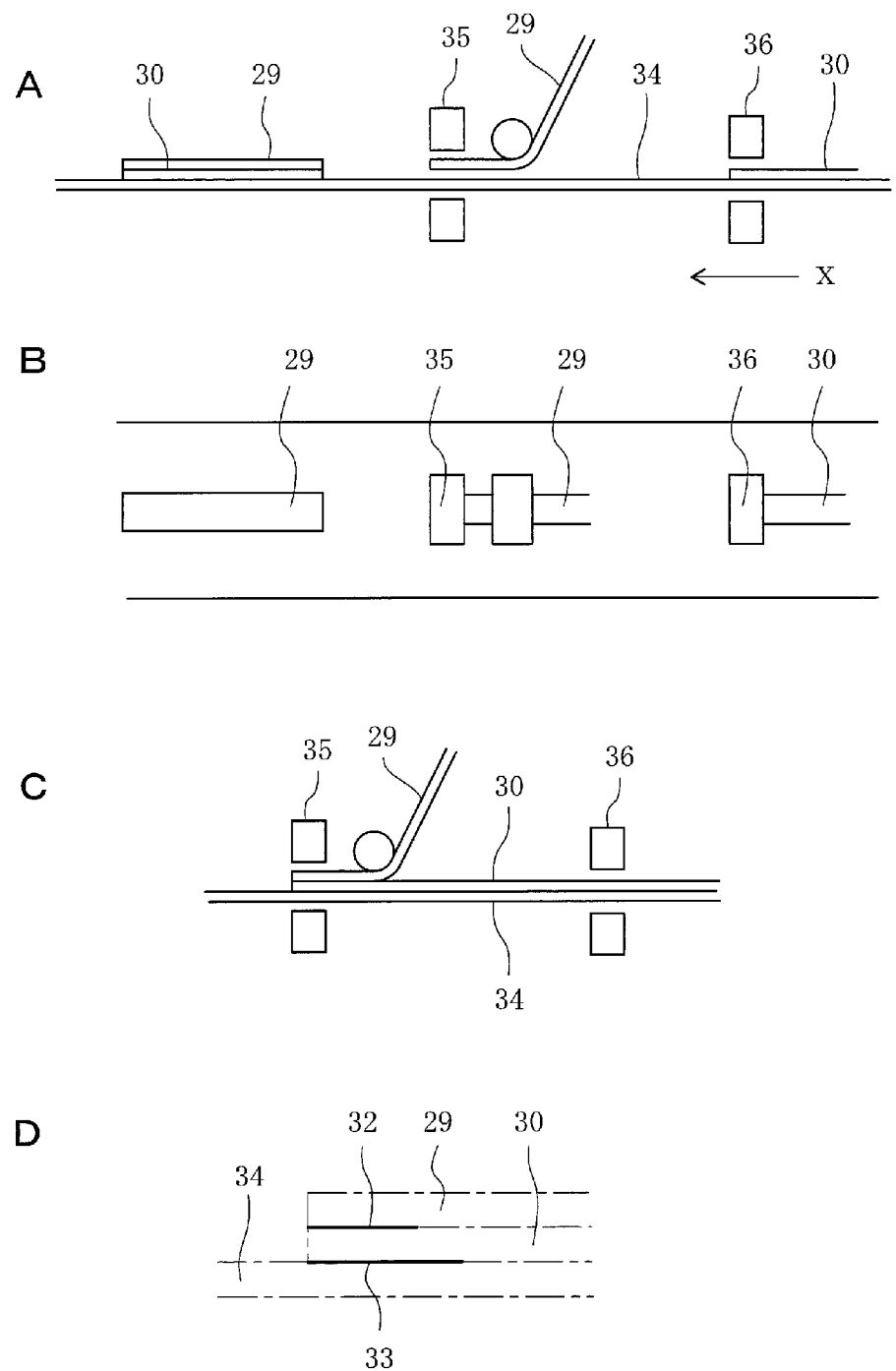
FIG. 7 is a side view (A) of another embodiment, a plan view (B) of the plastic films of (A), a side view (C) of the step next to (A) and an enlarged view (D) of the plastic films of (A).
Figure 8:
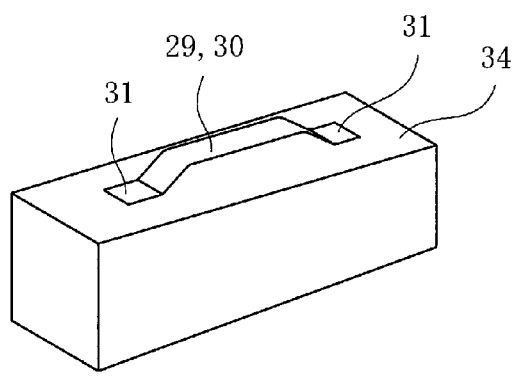
FIG. 8 is a perspective view (A) of a handle obtained by the apparatus of FIG. 7, a sectional view (B) of the handle of (A) and an explanatory view (C) of the handle of (B).
Figure 8:
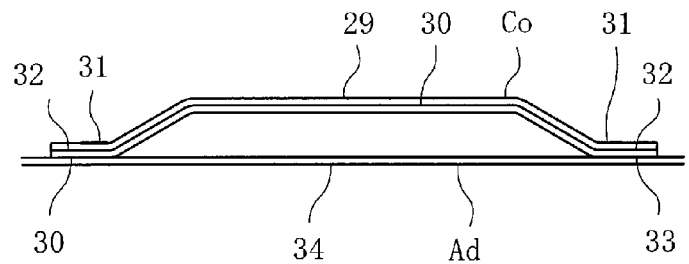
Figure 8:
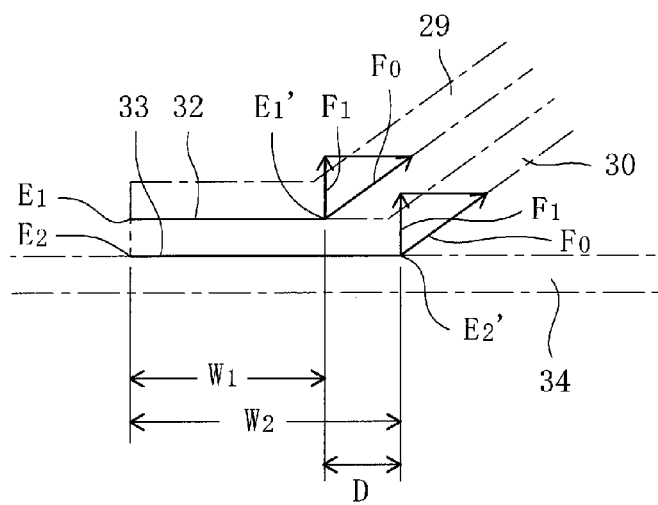

FIG. 7 illustrates an apparatus for successively making plastic bags and handles by using the plastic film joining method according to the invention. In the embodiment, a composed film Co is composed of external and internal films 29 and 30 opposed to and superposed with each other, to have opposite end portions 31, as shown in FIG. 8. The composite film Co is opposed to and superposed with an additional body Ad. The method includes joining the external and internal films 29 and 30 and the additional body Ad with each other at the opposite end portions 31 so that a first joining portion 32 should be formed between the external and internal films 29 and 30, a second joining portion 33 being formed between the internal film 30 and the additional body Ad. The first joining portion 32 has a first joining width W1 and includes first outer and inner edges E1 and E1' formed by the first joining width W1. The second joining portion 33 has a second width W2 and includes second outer and inner edges E2 and E2' formed by the second joining width W2.

In the embodiment, the composite film Co is elongated to have a length so that the handle should be formed of the composite film Co. The external and internal films 29 and 30 comprise plastic films. On the other hand, the additional body Ad comprises a base film 34. The base film 34 also comprises a plastic film. The apparatus is arranged to successively make plastic bags of the base film 34.

In order to make the plastic bag and the handle of FIG. 8, in the apparatus of FIG. 7, the external and internal films 29 and 30 and the base film 34 are superposed with each other and fed longitudinally thereof or in a direction X, as in the case of the embodiment of FIG. 1. The method comprises making an adjustment of the first or second joining widths W1 or W2, the first joining width W1 being less than the second joining width W2 so that the inner edge E1' should be formed outwardly of the second inner edge E2' (FIG. 8 C).

In the embodiment, making the adjustment comprises preparing first and second heaters 35 and 36 for the first and second joining portions 32 and 33. The external and internal films 29 and 30 and the base film 34 are fed intermittently for lengths and stopped temporarily whenever being fed intermittently. The first heater 35 is pressed against the external and internal films 29 and 30 and the base film 34 while the second heater 36 is pressed against the internal film 30 and the base film 34 when the base film 34 is stopped temporarily whenever being fed intermittently, to heat seal and join the external and internal films 29 and 30 and the base film 34 with each other.

In addition, firstly, the internal film 30 is superposed with the base film 34 and directed to the second heater 36. The second heater 36 is pressed against the internal film 30 and the base film 34 to heat seal and join the internal film 30 and the base film 34 with each other and make the second joining portion 33 at one of the end portions of the internal film 30 when the base film 34 is stopped temporarily (FIG. 7 A). The second heater 36 includes an effective width predetermined for adjustment of the second joining width W2. The external film 29 is directed to the first heater 37 for waiting.

Subsequently, the base film 34 is fed again. The internal film 30 is therefore pulled and fed by the base film 34 so that the external film 29 should be superposed with the internal film 30 (FIG. 7 C). The base film 34 is then stopped temporarily. The first heater 35 is pressed against the external and internal films 29 and 30 and the base film 34 to heat seal and join the external and internal films 29 and 30 with each other and make the first joining portion 32 at one of the end portions of the external and internal films 29 and 30. The first heater 35 includes an effective width predetermined for adjustment of the first joining width W1. The base film 34 is then fed again so that the external film 29 should be pulled and fed by internal film 30 and the base film 34.

The internal film 30 includes perforations formed therein to extend widthwise of the internal film 30. The perforations are spaced from each other at a distance, longitudinally of the internal film 30. In addition, the internal film 30 is pulled and fed by the base film 34 after heat sealing and joining the internal film 30 and the base film 34 at one of the end portions of the internal film 30, as described previously. The internal film 30 is then stopped by a brake force when the perforation reaches the second heater 36. The brake force is applied on the internal film 30 at a position upstream of the perforation. The internal film 30 is therefore pulled by the base film 34 to be torn at the perforation. Furthermore, the base film 34 is stopped temporarily immediately before the perforation reaches the second heater 36. The second heater 36 is pressed against the internal film 30 and the base film 34 to heat seal and join the internal film 30 and the base film 34 with each other and make the second joining portion 33 formed. The base film 34 is then fed again so that the internal film 30 is pulled and fed by the base film 34 to be torn at the perforation when the perforation reaches the second heater 36. The internal film 30 is torn into a length. It should therefore be understood that the second heater 36 can heat seal and join the internal film 30 and the base film 34 with each other and make the second joining portion 33 formed at the other end portion of the internal film 30.

The external film 29 also includes perforations formed therein to extend widthwise of the external film 29. The perforations are spaced from each other at the same distance as the internal film 30, longitudinally of the external film 29. In addition, the external film 29 is pulled and fed by internal film 30 and the base film 34 after heat sealing and joining the external and internal films 29 and 30 at one of the end portions thereof. The external film 29 is then stopped by a brake force when the perforation reaches the first heater 35. The brake force is applied on the external film 29 at a position upstream of the perforation. The external film 29 is therefore pulled by the base film 34 to be torn at the perforation. Furthermore, the base film 34 is stopped temporarily immediately before the perforation reaches the first heater 35. The first heater 35 is pressed against the external and internal films 29 and 30 and the base film 34 to heat seal and join the external and internal films 29 and 30 with each other and make the first joining portion 32 formed. The base film 34 is then fed again so that the external film 29 is pulled and fed by the base film 34 to be torn at the perforation when the perforation reaches the first heater 35. The external film 29 is torn into the same length as the internal film 30. It should therefore be understood that the first heater 35 can heat seal and join the external and internal films 29 and 30 with each other and make the first joining portion 32 formed at the other end portions of the external and internal films 29 and 30.

The base film 34 is fed again so that the external and internal films 29 and 30 should be fed by the base film 34 after being torn. The base film 34 is then stopped temporarily. The second heater 36 is pressed against the internal film 30 and the base film 34 to heat seal and join them again at one of the end portions of the internal film 30. The steps are then performed repeatedly, as described previously.

The method can therefore heat seal and join the external and internal films 29 and 30 and the base film 34 with each other and make the first and second joining portions 32 and 33 formed at the opposite end portions of the external and internal films 29 and 30. Accordingly, the handle can be formed of the composite film Co composed of the external and internal films 29 and 30 after making the plastic bag of the base film 34.

In addition, the first joining width W1 can be less than the second joining width W2 by the adjustment, so that the first inner edge E1' should be formed outwardly of the second inner edge E2'. For example, the first inner edge E1' is formed outwardly of the second inner edge E2' at a distance D more than half of the thickness of internal film 30. The distance D may be predetermined as more than 0.04 mm. As a result, the internal film 30 and the base film 34 cannot be peeled and separated off from each other at the second joining portion 33, keeping the handle from being disconnected from the plastic bag.

Figure 9:
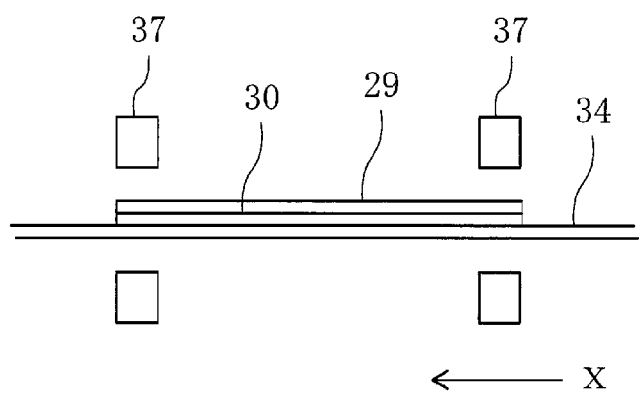
FIG. 9 is a side view (A) of another embodiment and an enlarged view (B) of the plastic films of (A).
Figure 9:
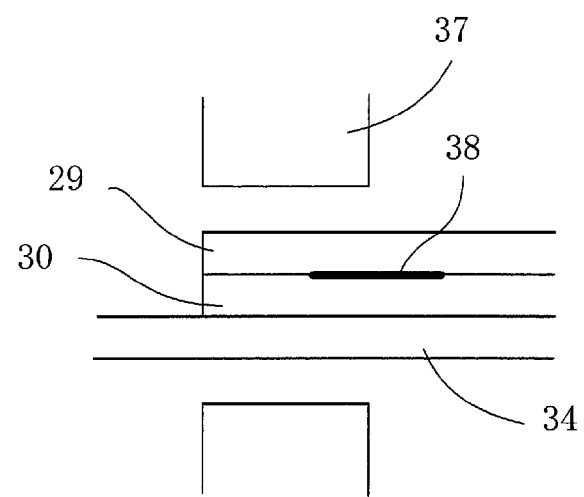

In another embodiment of FIG. 9, making the adjustment comprises preparing a heater 37 for the first and second joining portions 32 and 33. In addition, a coating of anti-adhesive agent 38 is formed between the external and internal films 29 and 30 when the external and internal films 29 and 30 and the base film 34 are superposed with each other. The coating of anti-adhesive agent may comprise a coating of heat-resisting ink.

Subsequently, the heater 37 is pressed against the external and internal films 29 and 30 and the base film 34 to heat seal and join the external and internal films 29 and 30 and the base film 34. The first joining portion 32 is therefore formed between the external and internal films 29 and 30, the second joining portion 33 being formed between the internal film 30 and the base film 34. The heater 37 may comprise two heaters to heat seal and join the external and internal films 29 and 30 and the base film 34 and make the first and second joining portions 32 and 33 formed at the opposite end portions of the external and internal films 29 and 30. The coating of anti-adhesive agent 38 is formed between the external and internal films 29 and 30 at each of the end portions thereof. In addition, the coating of anti-adhesive agent 38 is disposed at a position and in a range predetermined for adjustment of the first joining width W1. In this connection, it should be understood that the heater 37 cannot heat and join the external and internal films 29 and 30 at the position and in the range of coating of anti-adhesive agent 38, when being pressed.

The handle can therefore be formed of the composite film Co composed of the external and internal films 29 and 30 after making the plastic bag of the base film 34.

In addition, the first joining width W1 can be less than the second joining width W2 by the adjustment, so that the first inner edge E1' should be formed outwardly of the second inner edge E2'.

Figure 10:
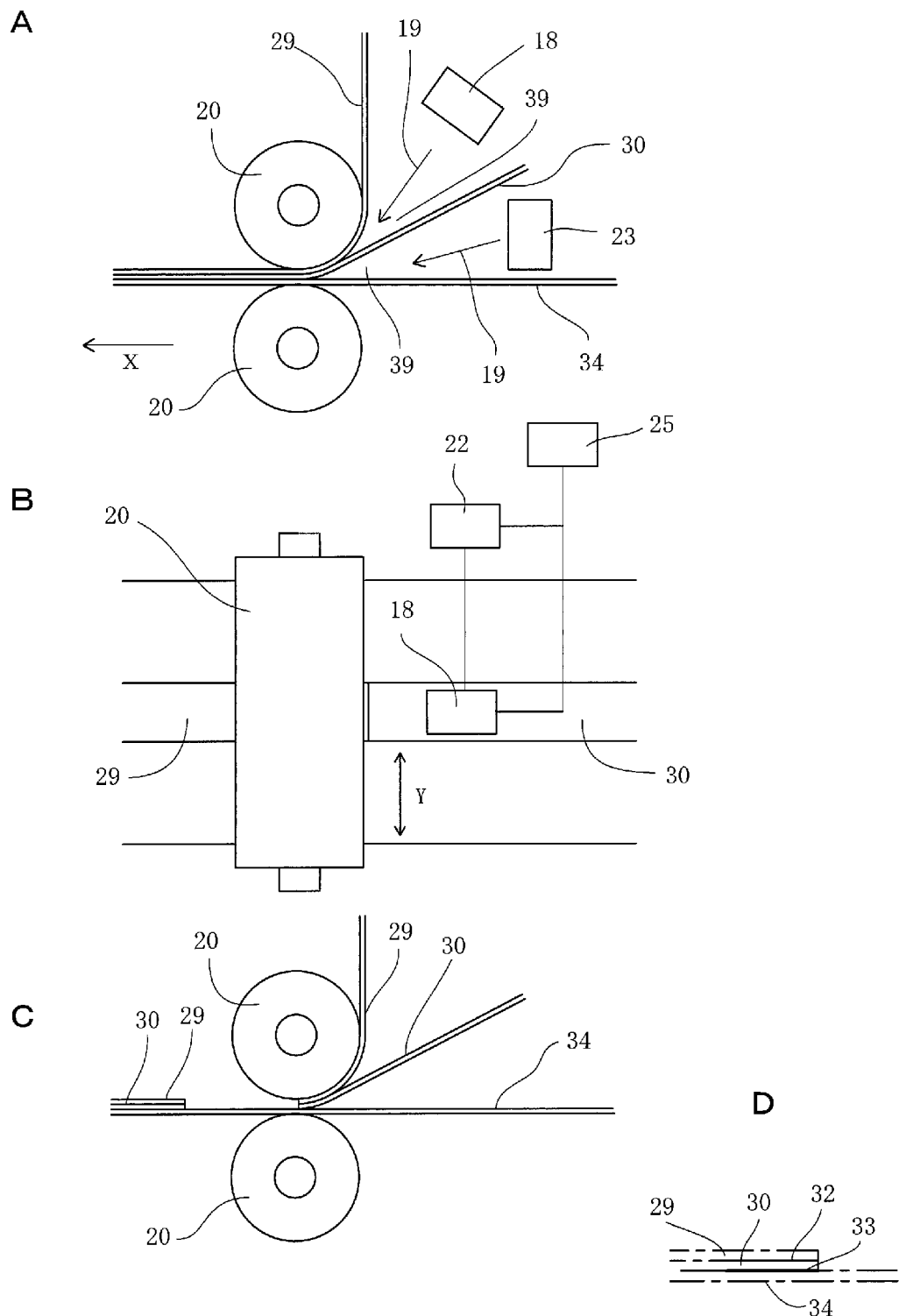
FIG. 10 is a side view (A) of another embodiment, a plan view (B) of the plastic films of (A), a side view (C) of the step next to (A) and an enlarged view (D) of the plastic films of (C).
Figure 1:
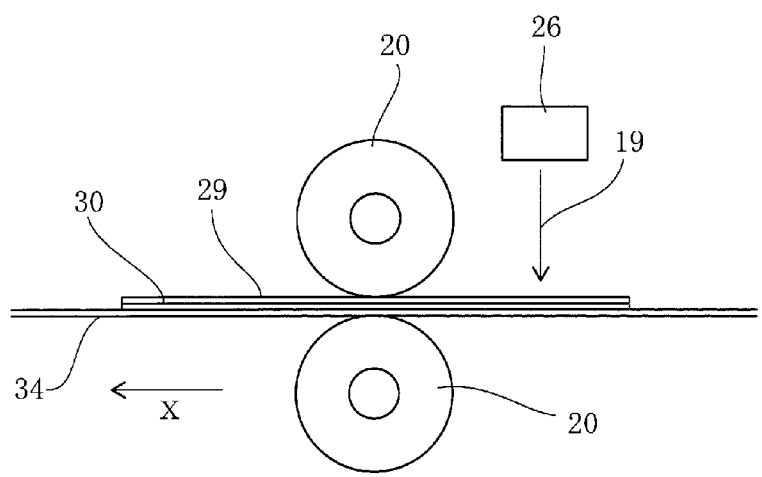
Figure 1:
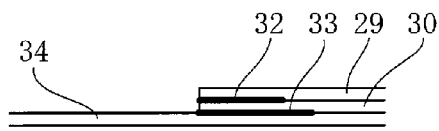
Figure 1:
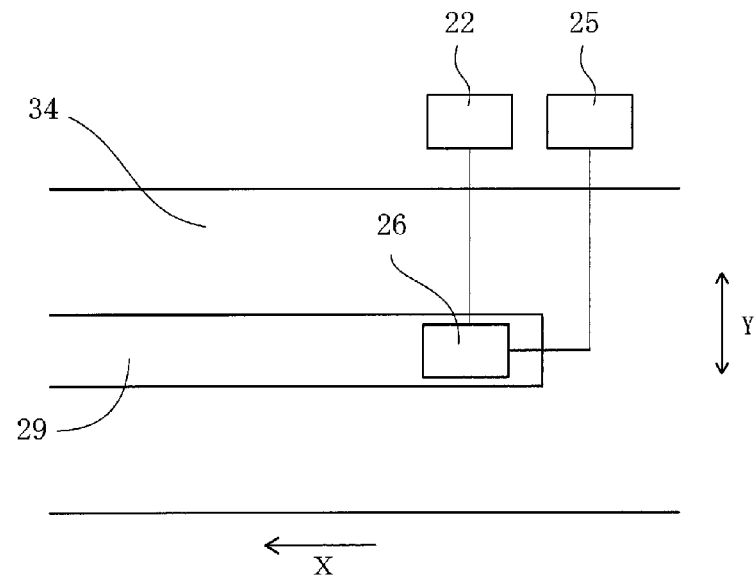

In another embodiment of FIG. 10, making the adjustment comprises preparing first and second irradiators 18 and 23 for irradiating laser-beam between and onto the external and internal films 29 and 30 and the base film 34, as in the case of the embodiment of FIG. 4. The pressure rollers 20 are opposed to each other, the external and internal films 29 and 30 and the base film 34 being directed to and curved along the pressure rollers 20 to have curved portions before being directed to the feeding rollers. A wedged clearance 39 is therefore formed between the curved portions of external and internal films 29 and 30, a wedged clearance 39 being formed between the curved portions of internal film 30 and the base film 34. The first and second irradiators 18 and 23 are disposed in the wedged clearances 39 of external and internal films 29 and 30 and base film 34 to irradiate laser-beam 19 between and onto the external and internal films 29 and 30 and the base film 34.

In addition, first and second scanning devices 22 are connected to the first and second irradiators 18 and 23 to move the first and second irradiators 18 and 23 in opposite directions Y so that the external and internal films 29 and 30 and the base film 34 should be scanned with the first and second irradiators 18 and 23, to heat and melt the external and internal films 29 and 30 and the base film 34 with the laser-beam. The external and internal films 29 and 30 and the base film 34 are then superposed with each other and sandwiched between and pressurized by the pressure rollers 20, to weld and join the external and internal films 29 and 30 and the base film 34 with each other.

The external and internal films 29 and 30 and the base film 34 are fed longitudinally thereof, when irradiating the laser-beam 19. In addition, it is intended to move the first and second irradiators 18 and 23 widthwise of the external and internal films 29 and 30 and the base film 34 or in the opposite directions Y. The first and second joining portions 32 and 33 can therefore be formed longitudinally and widthwise of the external and internal films 29 and 30 and the base film 34. Each of the first and second scanning devices 22 may comprise a galvanometer mirror to make the external and internal films 29 and 30 and the base film 34 scanned exactly.

In addition, a control device 25 is connected to the first and second irradiators 18 and 23 and the first and second scanning devices 22 to control the first and second irradiators 18 and 23 and the first and second scanning devices 22 individually for adjustment of the first and second widths W1 and W2.

The external and internal films 29 and 30 includes perforations formed therein to extend widthwise of the external and internal films 29 and 30. The perforations are spaced from each other at a length longitudinally of the external and internal films 29 and 30. In addition, the external and internal films 29 and 30 are stopped by brake forces when the perforations reach the rollers 20. The brake forces are applied on the external and internal films 29 and 30 at positions upstream of the perforations. The external and internal films 29 and 30 are therefore pulled by the base film 34 at positions downstream of the perforations, to be torn at the perforations (FIG. 10 C). In this connection, it is preferable that one of the rollers 20 is engaged with the base film 34 and rotated by friction while the other roller 20 is engaged with the external and internal films 29 and 30 and stopped not to be rotated, so that the external and internal films 29 and 30 can be torn without difficulty. One of the rollers 20 may be rotated by the drive motor.

Furthermore, the first and second irradiators 18 and 23 irradiate laser-beams between and onto the external and internal films 29 and 30 and the base film 34, the external and internal films 29 and 30 and the base film 34 being pressurized by the rollers 20, immediately before the perforations reach the rollers 20. The external and internal films 29 and 30 are then torn at the perforations when the perforations reach the rollers 20. It should therefore be understood that the first and second irradiators 18 and 23 cooperate with the rollers 20 to weld and join the external and internal films 29 and 30 and the base film 34 with each other and make the first and second joining portions 32 and 33 formed at the trailing end portions of the external and internal films 29 and 30. The base film 34 is then fed again so that the external and internal films 29 and 30 should be pulled and fed by the base film 34 after being torn.

Subsequently, the first and second irradiators 18 and 23 irradiate laser-beams again, the external and internal films 29 and 30 being pressurized by the rollers 20, after the base film 34 is fed for a length. It should therefore be understood that the first and second irradiators 18 and 23 cooperate with the rollers 20 to weld and join the external and internal films 29 and 30 and the base films 34 again at the leading end portions of the external and internal films 29 and 30. The brake force is then released so that the external and internal films 29 and 30 should be pulled and fed by the base film 34.

The first and second irradiators 18 and 20 irradiate laser-beams again immediately before the perforations reach the rollers 20, the steps being then performed repeatedly, as described previously.

The method can therefore weld and join the external and internal films 29 and 30 and the base film 34 with each other and make the first and second joining portions 32 and 34 formed at the opposite end portions of the external and internal films 29 and 30. Accordingly, the handle can be formed of the composite film Co composed of the external and internal films 29 and 30 after making the plastic bag of the base film 34.

In addition, the first joining width W1 can be less than the second joining width W2 by the adjustment, so that the first inner edge E1' should be formed outwardly of the second inner edge E2'.

In another embodiment of FIG. 11, an irradiator 26 is opposed to the external and internal films 29 and 30 and the base film 34 superposed with each other to irradiate laser-beam onto the external and internal films 29 and 30 and the base film 34. The external and internal films 29 and 30 and the base film 34 are then directed to and sandwiched between and pressurized by the pressure rollers 20, as in the case of the external and internal films 1, 2, 6 and 7 of FIG. 5.

In addition, treatments of laser absorption are applied between the external and internal films 29 and 30 and the base film 34 to weld and join the external and internal films 29 and 30 and the base film 34 with each other by irradiating the laser-beam, as also in the case of the embodiment of FIG. 5.

The external and internal films 29 and 30 and the base film 34 are fed longitudinally thereof. A scanning device 22 is connected to the irradiator 26 while a control device 25 is connected to the irradiator 26 and the scanning device 22, as also in the case of the embodiment of FIG. 5.

The joining portions 32 and 33 can therefore be formed longitudinally and widthwise of the external and internal films 29 and 30 and the base film 34 by the treatments of laser absorption applied longitudinally and widthwise of the external and widthwise of the external and internal films 29 and 30 and the base film 34. In addition, the treatments of laser absorption are disposed at positions and in ranges predetermined for adjustment of the first and second widths W1 and W2

The handle can therefore be formed by the composite film Co composed of the external and internal films 29 and 30 after making the plastic bag of the base film 34.

In addition, the first joining width W1 can be less than the second joining width W2 by the adjustment, so that the first inner edge E1' should be formed outwardly of the second inner edge E2'.

In the embodiments of FIGS. 7 to 11, an intermediate film may be interposed between the external and internal films 29 and 30, an intermediate film being interposed between the internal film 30 and the base film 34. The method includes joining the external, intermediate and internal films. The plurality of joining widths W1 are predetermined to be less in stages. The plurality of inner edges E1' are formed outwardly in stages.

The intermediate film may comprise a plurality of films.

Adhesive agent may be applied onto the external and internal films 29 and 30 and the base film 34 to adhere and join the external and internal films 29 and 30 and the base film 34 when making the plastic bag and the handle of FIG. 8.

What is claimed is:

1. A plastic film joining method in which a composite film is composed of external and internal films opposed to and superposed with each other, to have opposite end portions, the composite film being opposed to and superposed with an additional body, the method including joining the external and internal films and the additional body with each other at one of the end portions so that a first joining portion is formed between the external and internal films, a second joining portion being formed between the internal film and the additional body, the first joining portion having a first joining width and including first outer and inner edges formed by the first joining width, the second joining portion having a second joining width and including second outer and inner edges formed by the second joining width, the method comprising:

making an adjustment of the first or second joining width, the first joining width being less than the second joining width so that the first inner edge is formed outwardly of the second inner edge, wherein the additional body comprises a composite film composed of external and internal films opposed to and superposed with each other, to have opposite end portions, wherein the making of the adjustment is performed by:

joining all the films with each other at the opposite end portions of the composite films to make a plastic bag.

2. The method as set forth in claim 1 wherein the plastic bag is an internal bag received in a bag in a box.

3. A plastic film joining method in which a composite film is composed of external and internal films opposed to and superposed with each other, to have opposite end portions, the composite film being opposed to and superposed with an additional body, the method including joining the external and internal films and the additional body with each other at one of the end portions so that a first joining portion is formed between the external and internal films, a second joining portion being formed between the internal film and the additional body, the first joining portion having a first joining width and including first outer and inner edges formed by the first joining width, the second joining portion having a second joining width and including second outer and inner edges formed by the second joining width, the method comprising:

making an adjustment of the first or second joining width, the first joining width being less than the second joining width so that the first inner edge is formed outwardly of the second inner edge, wherein the additional body comprises the other end portion of the composite film, the composite film being bent to have the opposite end portions opposed to and superposed with each other, wherein the making of the adjustment is performed by:

joining all the films with each other at the opposite end portions to make a plastic bag.

4. The method as set forth in claim 3 wherein the plastic bag is an internal bag received in a bag in a box.

5. A plastic film joining method in which a composite film is composed of external and internal films opposed to and superposed with each other, to have opposite end portions, the composite film being opposed to and superposed with an additional body, the method including joining the external and internal films and the additional body with each other at one of the end portions so that a first joining portion is formed between the external and internal films, a second joining portion being formed between the internal film and the additional body, the first joining portion having a first joining width and including first outer and inner edges formed by the first joining width, the second joining portion having a second joining width and including second outer and inner edges formed by the second joining width, the method comprising:

making an adjustment of the first or second joining width, the first joining width being less than the second joining width so that the first inner edge is formed outwardly of the second inner edge, wherein the making of the adjustment is performed by:

preparing first and second heaters for the first and second joining portions;

making the internal film superposed with the additional body, the second heater being pressed against the internal film and the additional body to heat seal and join the internal film and the additional body with each other and make the second joining portion formed, the second heater having an effective width predetermined for adjustment of the second joining width; and then making the external film superposed with the internal film, the first heater being pressed against the external and internal films and the additional body to heat seal and join the external and internal films with each other and make the first joining portion formed, the first heater having an effective width predetermined for adjustment of the first joining width.

6. A plastic film joining method in which a composite film is composed of external and internal films opposed to and superposed with each other, to have opposite end portions, the composite film being opposed to and superposed with an additional body, the method including joining the external and internal films and the additional body with each other at one of the end portions so that a first joining portion is formed between the external and internal films, a second joining portion being formed between the internal film and the additional body, the first joining portion having a first joining width and including first outer and inner edges formed by the first joining width, the second joining portion having a second joining width and including second outer and inner edges formed by the second joining width, the method comprising:

making an adjustment of the first or second joining width, the first joining width being less than the second joining width so that the first inner edge is formed outwardly of the second inner edge, wherein the making of the adjustment is performed by:

preparing a heater for the first and second joining portions;

making a coating of anti-adhesive agent formed between the external and internal films when the external and internal films and the additional body are superposed with each other; and then making the heater pressed against the external and internal films and the additional body to heat seal and join the external and internal films and the additional body with each other and make the first and second joining portion formed, the coating of anti-adhesive agent being disposed at a position and in a range predetermined for adjustment of the first joining width.

7. A plastic film joining method in which a composite film is composed of external and internal films opposed to and superposed with each other, to have opposite end portions, the composite film being opposed to and superposed with an additional body, the method including joining the external and internal films and the additional body with each other at one of the end portions so that a first joining portion is formed between the external and internal films, a second joining portion being formed between the internal film and the additional body, the first joining portion having a first joining width and including first outer and inner edges formed by the first joining width, the second joining portion having a second joining width and including second outer and inner edges formed by the second joining width, the method comprising:

making an adjustment of the first or second joining width, the first joining width being less than the second joining width so that the first inner edge is formed outwardly of the second inner edge, wherein the making of the adjustment is performed by:

preparing a first irradiator for laser-beam irradiating between and onto the external and internal films;

preparing a first scanning device connected to the first irradiator to move the first irradiator in opposite directions so that the external and internal films are scanned with the first irradiator, welding and joining the external and internal films with each other;

preparing a second irradiator for laser-beam irradiating between and onto the internal film and the additional body;

preparing a second scanning device connected to the second irradiator to move the second irradiator in the opposite directions so that the internal film and the additional body are scanned with the second irradiator, welding and joining the internal film and the additional body with each other; and preparing a control device connected to the first and second irradiators and the first and second scanning device to control the first and second irradiators and the first and second scanning devices individually for adjustment of the first and second joining widths.

8. A plastic film joining method in which a composite film is composed of external and internal films opposed to and superposed with each other, to have opposite end portions, the composite film being opposed to and superposed with an additional body, the method including joining the external and internal films and the additional body with each other at one of the end portions so that a first joining portion is formed between the external and internal films, a second joining portion being formed between the internal film and the additional body, the first joining portion having a first joining width and including first outer and inner edges formed by the first joining width, the second joining portion having a second joining width and including second outer and inner edges formed by the second joining width, the method comprising:

making an adjustment of the first or second joining width, the first joining width being less than the second joining width so that the first inner edge is formed outwardly of the second inner edge, wherein the making of the adjustment is performed by:

preparing an irradiator opposed to the external and internal films and the additional body superposed with each other to laser-beam irradiate onto the external and internal films and the additional body; and making treatments of laser absorption applied between the external and internal films and the additional body to weld and join the external and internal films and the additional body with each other by laser-beam irradiating, the treatments of laser absorption being disposed at positions and in ranges predetermined for adjustment of the first and second joining widths.

9. A plastic film joining method in which a composite film is composed of external and internal films opposed to and superposed with each other, to have opposite end portions, the composite film being opposed to and superposed with an additional body, the method including joining the external and internal films and the additional body with each other at one of the end portions so that a first joining portion is formed between the external and internal films, a second joining portion being formed between the internal film and the additional body, the first joining portion having a first joining width and including first outer and inner edges formed by the first joining width, the second joining portion having a second joining width and including second outer and inner edges formed by the second joining width, the method comprising:

making an adjustment of the first or second joining width, the first joining width being less than the second joining width so that the first inner edge is formed outwardly of the second inner edge, wherein the making of the adjustment is performed by:

interposing an intermediate film between the external and internal films; and joining the external, intermediate and internal films with each other, the first joining portion comprising a plurality of joining portions, the first joining width comprising a plurality of joining widths, the first inner edge comprising a plurality of inner edges, the plurality of joining widths being predetermined to be less in stages, the plurality of inner edges being formed outwardly in stages.

10. A plastic film joining method in which a composite film is composed of external and internal films opposed to and superposed with each other, to have opposite end portions, the composite film being opposed to and superposed with an additional body, the method including joining the external and internal films and the additional body with each other at one of the end portions so that a first joining portion is formed between the external and internal films, a second joining portion being formed between the internal film and the additional body, the first joining portion having a first joining width and including first outer and inner edges formed by the first joining width, the second joining portion having a second joining width and including second outer and inner edges formed by the second joining width, the method comprising:

making an adjustment of the first or second joining width, the first joining width being less than the second joining width so that the first inner edge is formed outwardly of the second inner edge, wherein the making of the adjustment is performed by:

joining the external and internal films and the additional body with each other at the other end portion of the composite film so that a handle is formed of the composite film.

* * * * *